C. W. HALSEY.
SCOOP ICE CHIPPER.
APPLICATION FILED JULY 26, 1919. RENEWED APR. 15, 1922.
1,435,061.
Patented Nov. 7, 1922.
2 SHEETS—SHEET 1.
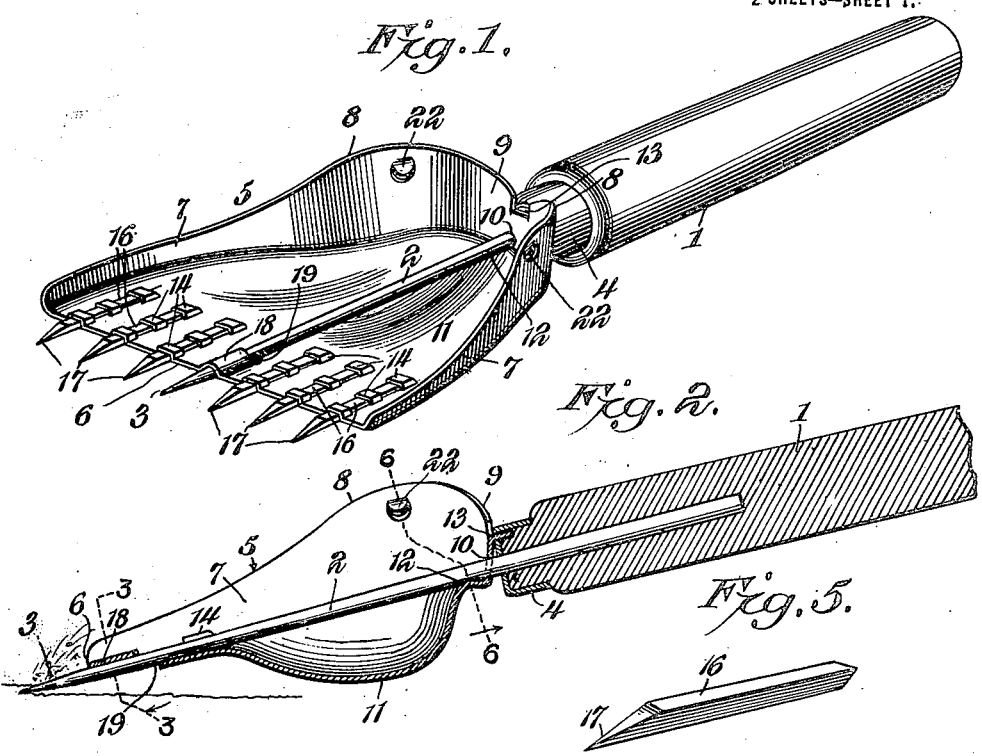
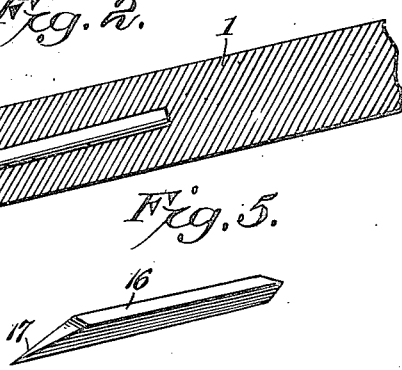
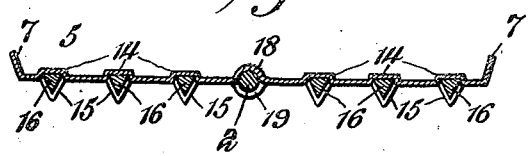
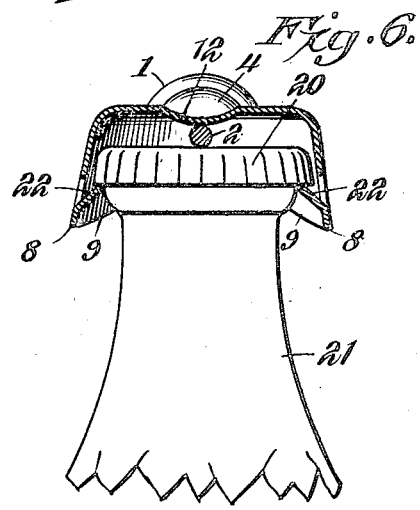
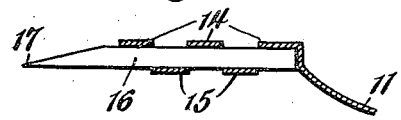
WITNESSES
Howard D. Orr.
F. T. Chapman.
Charles W. Halsey, INVENTOR,
BY
ATTORNEY

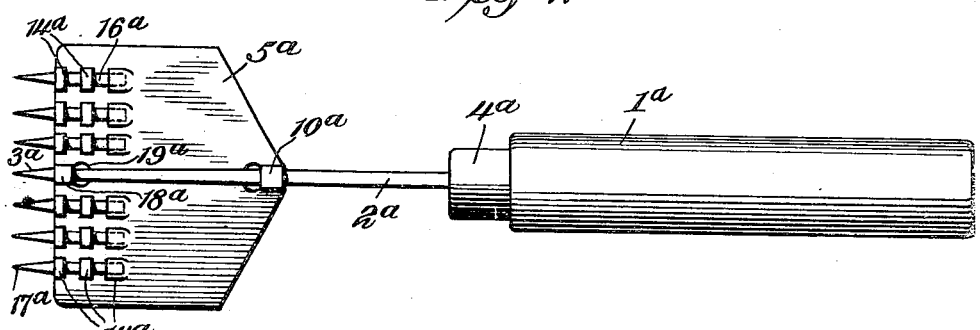
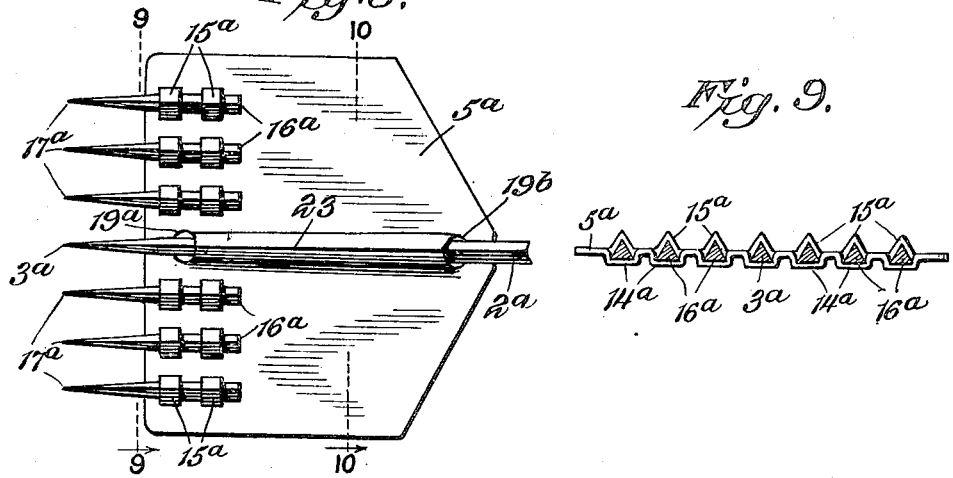
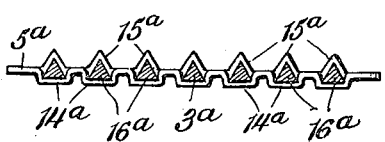
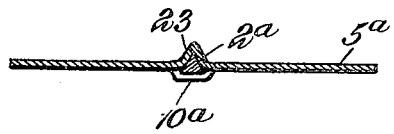

Patented Nov. 7, 1922.

1,435,061

UNITED STATES PATENT OFFICE.

CHARLES W. HALSEY, OF EVANSVILLE, INDIANA.

SCOOP ICE CHIPPER.

Application filed July 26, 1919, Serial No. 313,495. Renewed April 15, 1922. Serial No. 553,015.

*To all whom it may concern:*

Be it known that I, CHARLES W. HALSEY, a citizen of the United States, residing at Evansville, in the county of Vanderburg and State of Indiana, have invented a new and useful Scoop Ice Chipper, of which the following is a specification.

This invention has reference to scoop ice chippers, and its object is to provide a device whereby ice may be reduced to fine chips and gathered in a scoop without material waste, and which device may also be employed as an ice pick, as well as being useful for other purposes.

In accordance with one form of the invention, there is provided a scoop-shaped receptacle for the chipped ice, which receptacle may be stamped out of sheet metal, and at the forward or working edge a series of teeth are provided separately formed from and attached to the scoop and so arranged that when the scoop is pushed forwardly over the surface of a cake of ice, such ice is reduced to the form of fine chips which are deposited in the scoop for such use as may be desired. The scoop is provided with a handle having an ice-pick extension of a sufficient length to project through and beyond the scoop, thereby sustaining the latter and also constituting one of the chipping points. The scoop is provided with in-turned fingers to adapt the scoop to serve as a bottle cap remover.

In a simpler form of the invention the scoop is replaced by a flat plate to serve as a receptacle for the ice chips and instead of a separately usable ice pick the latter has the plate fast thereto and all of the points are used for ice-chipping purposes only.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a perspective view of the device of the invention.

Figure 2 is a longitudinal central section.

Figure 3 is a section on the line 3—3 of Figure 2, but drawn on a larger scale.

Fig. 4 is a detail view with parts in section showing the manner in which one of the chipping points is held.

Figure 5 is a perspective view of one of the chipping points.

Figure 6 is a section on the line 6—6 of Figure 2, but with the device inverted and applied to a bottle for removing the cap thereof.

Figure 7 is a top plan view of the device constructed for chipping purposes only.

Figure 8 is a bottom plan view, on a larger scale, of the forward end of the device of Figure 7.

Figure 9 is a section on the line 9—9 of Figure 8.

Figure 10 is a section on the line 10—10 of Figure 8.

Referring to the drawings and particularly to Figures 1 to 6, there is shown a handle 1 which may be of convenient size and shape to be grasped by the human hand. Inserted in and projecting from one end of the handle is the shank or stem of an ice pick 2 of appropriate length and of round cross section, with one end pointed, as shown at 3, thereby providing a taper point which may be quite sharp. The end of the handle from which the ice pick 2 protrudes is protected by a ferrule 4.

There is also provided a body member 5 in the form of a scoop having a relatively broad forward end or mouth 6 which may be quite flat, and from the mouth end toward the rear end the scoop is provided with side walls 7 gradually approaching and rising in height, as shown at 8, and ultimately merging together to form a rear wall 9, through the center portion of which there is provided an opening 10 suitably shaped to pass the ice pick 2. The bottom of the scoop has a drop portion 11 of relatively large extent below the level of the ice pick 2 to provide a receptacle of appropriate capacity to receive the chipped ice. The drop portion 11 rises at the rear end and terminates in a protuberance 12 so situated as to be in the path of the lower edge of the ice pick 2 near where it enters the scoop from the handle 1. In this manner the proturberance 12 engages the ice pick 2 so as to place the scoop and ice pick under tension sufficient to bind the two together frictionally. At an intermediate point in the wall 9 a lip 13 is punched out and projects through a suitable slot in the ferrule 4, thereby holding the scoop from turning with respect to the handle, which would be likely to occur especially when the ice pick is formed of a bar or wire of round cross section. At the front end 6 the metal of the scoop is punched into opposed clips or loops 14, 15, adapted to receive chipping points 16, which, in the particular instance shown, are of triangular cross section and each terminates in a beveled end 17. The chipping points are arranged in a series across the front of the scoop on opposite sides of the ice pick 2 and the front 6 of the scoop is formed with a clip 18 and a hole 19 arranged to receive and pass the pointed end of the ice pick 2, thereby holding it firmly in place.

The rear wall 9 of the scoop is given a curved contour adapting it to fit more or less snugly about a bottle cap 20, shown applied to a bottle 21 in Figure 6. The wall 9 is provided at appropriately spaced points with punched in tongues 22 so positioned as to readily engage under the edge of the bottle cap 20 when the scoop is inverted and applied to the neck portion of the bottle so that the tongues 22 will engage under the bottle cap and permit the ready lifting of the bottle cap from the bottle.

The scoop 5 is readily applied to or withdrawn from the handle 1 along the ice pick or blade 2. The protuberance or raised portion 12 in the path of the pick or blade 2, by springing the blade a little out of true, causes the binding of the scoop on the blade sufficiently to prevent accidental loosening of the scoop. The lip or lug 13 prevents turning of the scoop on the blade 2.

With the scoop applied to the handle the ice pick end 3 and the chipping point ends 17 are moved forwardly over the surface of a block of ice, causing the ice to be reduced to fine chips or particles which are directed into the scoop, and by holding the free hand over the scoop the dislodged chips are directed into the scoop, falling into the drop portion 11 and there accumulating until the desired quantity has been obtained. The chipped ice may then be carried to and disposed at a suitable point for utilization. If larger pieces of ice are wanted the scoop is removed from the pick or blade 2, which latter remains in the handle 1, and the device is then used as an ordinary ice pick.

If it is desired to provide a cooled drink from a bottle of liquid closed by an ordinary bottle cap, the bottle may be opened by inverting the chipping scoop and applying it to the bottle cap in the manner shown in Figure 6, whereupon the cap is easily dislodged and the contents of the bottle poured into a glass or glasses. Then the chipping device may be moved over the surface of a cake of ice and quickly filled with small particles of ice scraped or chipped therefrom and finally deposited in the glass or glasses to cool the contents thereof.

The chipping points 16 may be of various shapes in cross section, whether of round, triangular, square, or other shape. The triangular cross section is desirable because it permits beveling of the point from the base toward the apex of the triangle, and with the apex downwardly in operation, the scoop readily chips the ice when on very nearly a level with the surface over which the chipping scoop is moved. Moreover chipping points of triangular shape are, to a limited extent, self-sharpening.

The chipping scoop has the advantage of low cost of construction, the utilization both as a chipping scoop and an ice pick and the use of the ice pick as a part of the chipping device. The employment of chipping points beveled to locate the cutting ends low permits the stroke of the chipping device to be on a very flat angle, this being important when the chipping device is used in an ice box where the block of ice may be close to the top of the ice chamber.

The clips holding the points are initially punched to a size allowing the points to be easily inserted in assembling and then by the application of a tightening die the metal is closed tightly up about the shanks of the points very securely holding them.

Certain features of the device are useful by themselves without combination with other features. For instance, the structure shown in Figures 7 to 10 is an illustration of this fact. In Figure 7 there is shown a handle 1$^a$ which may be in all essential respects the same as handle 1 and is provided with a ferrule 4$^a$. Projecting from the handle 1 through the ferrule 4$^a$ is a shank or stem 2$^a$ of appropriate length, which stem may be made of a rod or wire of suitable gage and instead of being round or of circular cross section, as in the structure of Figure 1, the shank or stem 2$^a$ may be of triangular cross section as indicated, and has its outer extremity 3$^a$ beveled and pointed like the chipping ends 17 of the structure shown in Figure 1. Instead of providing a scoop like the scoop 5 of Figure 1, the stem 2$^a$ is projected through a body member 5$^a$ in the form of a plate which may be of flat formation with a clip 10$^a$ for the passage of the stem 2$^a$ at the rear end of the plate and another clip 18$^a$ associated with a hole or passage 19$^a$ for the pointed end 3$^a$ of the stem 2$^a$. To accommodate the stem 2$^a$, which may be quite straight, the plate 5$^a$ throughout a material portion of its length and about midway of its width is formed with a groove 23 made by depressing the body of the plate below its general plane, leaving the hole or passage 19ª at one end and another hole or passage 19ᵇ at the other end to accommodate the stem 2ª. Since the stem 2ª may be of triangular cross section as indicated, the groove 23 and the clips 18ª and 10ª are suitably shaped and by means of an appropriate tool are forced into intimate contact with the stem 2ª so that the stem 2ª becomes so united with the plate 5ª that the union, for all ordinary uses, may be considered as permanent.

The forward end of the plate 5ª on opposite sides of the stem 2ª is formed with clips 14ª on one face and 15ª on the opposite face, arranged in alternation, so that chipping points 16ª, which may be similar to the chipping points 16 of the structure of Figure 1, may be secured to the plate 5ª in like manner to the chipping points 16 of Figure 1. The chipping points 16ª may be of triangular cross section like the chipping points 16 of Figure 1 and have sharp extremities 17ª like the extremities 17 of the structure of Figure 1. The structure of Figure 7 and associated figures is intended solely for chipping purposes and is of simpler and less expensive character than the structure of Figure 1, but of course is not capable of the same wide use as the structure of Figure 1.

What is claimed is:—

1. In an ice chipper, an open scoop-shaped receptacle with the forward edge flat and provided with a plurality of alined clips arranged in series extending across the forward edge, chipping points separate from the scoop mounted in the clips, the said scoop having upstanding side and rear walls and also having the bottom portion between the walls and in rear of the chipping points depressed below the sides of the scoop.

2. An ice chipper comprising a handle with an elongated ice pick or blade, and a scoop-shaped receptacle with a passage at the rear end of the ice pick, and means at the forward end located intermediate of the width of the scoop for passing the ice pick, with the latter projecting beyond the forward edge of the scoop, and chipping points separate from and fast to, and projecting from the forward edge of the scoop on opposite sides of the forward end of the ice pick to coact with the latter for chipping ice from a block thereof, the portion of the receptacle in rear of the chipping points providing for the reception of the particles of chipped ice.

3. An ice chipper comprising a handle with an elongated ice pick projecting therefrom, and a scoop-shaped receptacle with a passage at the rear for the ice pick, and means at the forward edge for passing and holding the forward end of the ice pick in projecting relation to the forward edge of the scoop, chipping points separate from, fast to and projecting from the forward edge of the scoop on opposite sides of the ice pick, and means at the forward portion of the scoop for holding the chipping points, the latter occupying the forward portion only of the receptacle leaving the remaining portion free to receive the chipped particles of ice.

4. An ice chipper comprising a handle with an elongated ice pick projecting therefrom, and a scoop-shaped receptacle with a passage at the rear for the ice pick, and means at the forward edge for passing and holding the forward end of the ice pick in projecting relation to the forward edge of the scoop, chipping points located at and projecting from the forward edge of the scoop on opposite sides of the ice pick, and means at the forward portion of the scoop for holding the chipping points in fixed relation to the receptacle at all times, said ice pick and chipping points having their forward ends each reduced to a sharp extremity.

5. An ice chipper comprising a handle with an elongated ice pick or blade and a scoop-shaped receptacle with a series of chipping points separate from and inserted in the forward edge of the scoop on opposite sides of the longitudinal center line of the scoop, said scoop having holding means for the forward end of the ice pick through which the front of the ice pick projects when in place, with the ice pick traversing the rear wall of the scoop, and said scoop having a rearwardly directed lip projecting into the handle.

6. An ice chipper comprising a handle with an elongated ice pick or blade, and a scoop with chipping points at the forward end, said scoop having side and rear walls and a depressed bottom portion, the rear wall having a passage for the ice pick and the bottom portion having an inward protuberance adjacent to the rear wall where traversed by the ice pick to engage and clamp the latter when the scoop is applied to the ice pick.

7. An ice chipper comprising a handle with an elongated pick or blade, a scoop-shaped receptacle applied to the blade with the latter located in the longitudinal center line of the scoop and projecting beyond the forward edge thereof, and separately formed attachable and removable chipping points at the forward edge of the scoop on opposite sides of the ice pick where projecting from the forward edge of the scoop, the chipping points and forward end of the ice pick coacting for operating on a block of ice to detach small particles therefrom and deposit them in the receptacle.

8. An ice chipper comprising a handle with an elongated pick or blade, a scoop-shaped receptacle applied to the blade with the latter located in the longitudinal center line of the scoop and projecting beyond the forward edge thereof, separately formed attachable and removable chipping points at the forward edge of the scoop on opposite sides of the ice pick where projecting from the forward edge of the scoop, the chipping points and forward end of the ice pick coacting for operating on a block of ice to detach small particles therefrom and deposit them in the receptacle, the chipping points being of triangular cross section with the base uppermost and the apex downward and beveled at the forward ends from the base toward the apex to produce tapering chipping extremities.

9. An ice chipper comprising a handle with an elongated ice pick, a scoop with chipping points at the forward end, said scoop having side and rear walls and a depressed bottom portion, the rear wall having a passage for the ice pick and the bottom portion having inward protuberances adjacent the rear wall where traversed by the ice pick to engage and clamp the latter when the scoop is applied to the ice pick.

10. An ice chipper comprising a handle with an elongated pick, a scoop-shaped receptacle applied to the pick with the latter projecting beyond the forward end of the scoop, separately formed attachable and removable chipping points secured at the forward edge of the scoop on opposite sides of the ice pick, the chipping points and forward end of the ice pick cooperating to detach particles of ice, the chipping points being of triangular cross-section with the base uppermost and the apex downward.

11. An ice chipper comprising a handle with an elongated ice pick, and a scoop-shaped receptacle, with a series of chipping points at the forward edge of the scoop on opposite sides of the ice pick, said ice pick traversing the rear wall of the scoop, said handle being provided with a ferrule at the end next the scoop, and the scoop having a rearwardly directed lip projecting through the ferrule and into the handle.

12. An ice chipping tool comprising a handle having an ice pick of circular cross-section secured therein at one end and being provided with a sharp rounded point at the other end, a scoop member secured to the handle and to said pick, said scoop being provided with a series of chipping points at its forward edge, said chipping points being of triangular cross-section.

13. An ice chipping tool provided with a body member, a handle and stem for carrying the body member, said stem terminating in a point remote from the handle, and chipping points arranged on opposite sides of the stem and separate from and carried by the body member in projecting relation to that edge of the body member remote from the handle, the chipping points being of triangular cross section with the chipping ends each beveled toward the apex of the triangle to provide a sharp cutting point.

14. An ice chipping tool provided with a body member, a handle and stem for carrying the body member, said stem terminating in a point remote from the handle, and chipping points arranged on opposite sides of the stem and separate from and carried by the body member in projecting relation to that edge of the body member remote from the handle, the chipping points being of triangular cross section with the chipping ends each beveled toward the apex of the triangle to provide a sharp cutting point, and the body member being provided with clips or loops for embracing the chipping points with the sharpened ends projecting beyond the forward edge of the body member.

15. An ice chipping tool provided with a body member, a handle and stem for carrying the body member, said stem terminating in a point remote from the handle, chipping points arranged on opposite sides of the stem and separate from and carried by the body member, and clips or loops carried by the body member for embracing the chipping points and holding the same at all times in projecting relation to that edge of the body member remote from the handle.

In testimony that I claim the foregoing as my own, I have hereto affixed my signature.

CHARLES W. HALSEY.

Witnesses:
 FLORELLA D. HALSEY,
 VIDA HALSEY.